United States Patent [19]

Barry, Jr. et al.

[11] Patent Number: 4,689,108

[45] Date of Patent: Aug. 25, 1987

[54] APPARATUS FOR ASSEMBLING ELECTROCHEMICAL BATTERIES AND SIMILAR ARTICLES

[75] Inventors: Joseph Barry, Jr., Woburn; Jerry Lewis, Lowell; Peter B. Harris, Dedham; William T. McHugh, Westwood, all of Mass.

[73] Assignee: GTE Government Systems Corporation, Waltham, Mass.

[21] Appl. No.: 794,881

[22] Filed: Nov. 4, 1985

[51] Int. Cl.$^4$ .................. B30B 15/06; B30B 15/34
[52] U.S. Cl. .................................. 156/499; 156/69; 156/304.6; 156/580; 156/583.1
[58] Field of Search .............. 156/499, 583.1, 380.9, 156/69, 272.8, 304.2, 304.6, 580, 580.1, 82

[56] References Cited

U.S. PATENT DOCUMENTS

| 4,226,652 | 10/1980 | Berg | 156/499 |
| 4,407,691 | 10/1983 | Ishii et al. | 156/304.6 |
| 4,515,651 | 5/1985 | MacLaughlin et al. | 156/499 |

Primary Examiner—Michael Wityshyn
Attorney, Agent, or Firm—J. Stephen Yeo

[57] ABSTRACT

A press is arranged to compress a workpiece between two turntables. One of the turntables is adapted to be rotated which, in turn, rotates the workpiece and the other turntable, a heating element is provided to seal seams on the workpiece.

1 Claim, 1 Drawing Figure

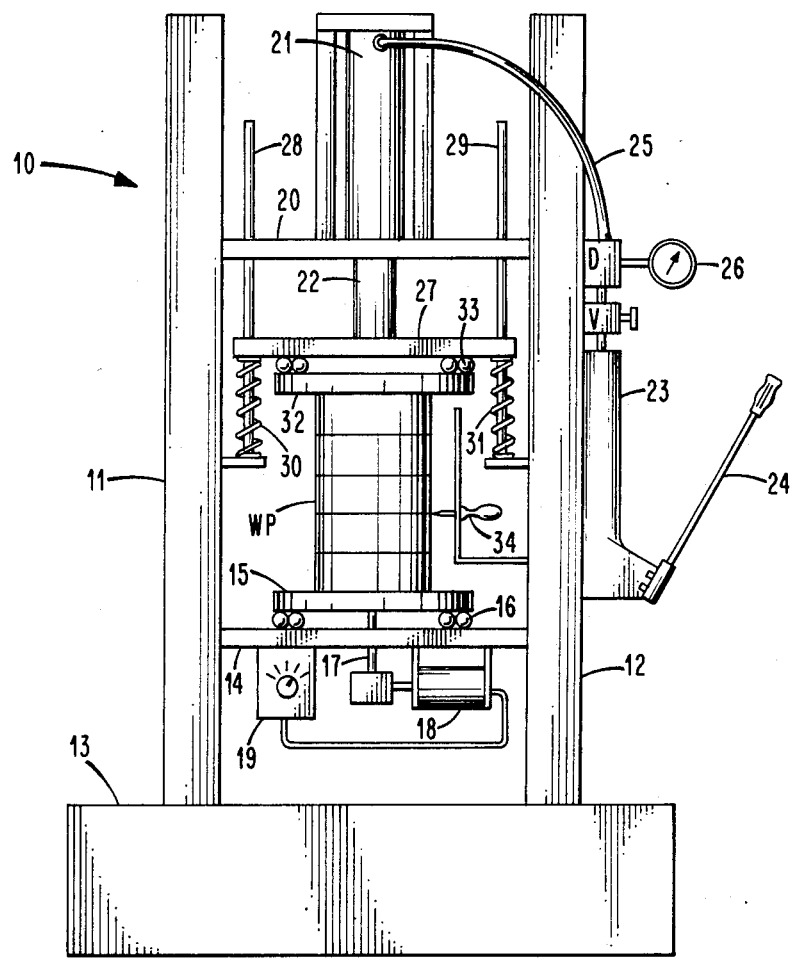

APPARATUS FOR ASSEMBLING ELECTROCHEMICAL BATTERIES AND SIMILAR ARTICLES

BACKGROUND OF THE INVENTION

The United States Government has rights to this invention under Contract F-33615-81-C-2088.

This invention pertains to apparatus useful for the assembly of mechanical elements of electrochemical batteries and the like and, more particularly, is concerned with such apparatus employing pressing means.

It is known to fabricate electrochemical batteries by fusing together a plurality of segments to make a unified battery housing. For example, U.S. Pat. No. 4,535,038 for Selection for Electrochemical Batteries divulges a battery housing made up of a plurality of ring-shaped segments, which are called frames in that patent. The segments are made of a heat fusible material such as polypropylene. A stacked assembly of segment electrodes, separators and other elements is compressed. The segments are then fused together using a heat source to form a unified battery housing. One way this has been achieved is by the use of a press and a hand held tool such as a soldering iron or heat gun. This procedure works well for small lots, but is time-consuming and not suitable for producing large quantities of batteries.

It is an object of the invention to provide means for assisting in the assembly of electrochemical batteries and the like having fusible ring-shaped segments.

SUMMARY OF THE INVENTION

Briefly, according to one aspect of the invention, two turntables are arranged facing each other. A press is adapted to reduce the distance between the turntables thereby compressing a workpiece between the turntables. One of the turntables is adapted to be rotated which, in turn, rotates the workpiece.

DESCRIPTION OF THE DRAWINGS

The single FIGURE illustrates an apparatus embodying the invention.

DESCRIPTION OF THE INVENTION

Reference is made to the drawing which illustrates an apparatus 10 which is one embodiment of the invention. The drawing shows the apparatus in a vertical orientation, but the apparatus will function in any orientation. The apparatus is shown holding a workpiece WP, such as an electrochemical battery.

Two parallel posts 11, 12 are arranged to extend from a mechanical ground 13 such as a table or a floor. The posts 11, 12 form the frame of the apparatus. A first plate 14 is mounted between posts 11, 12. A first turntable 15 is rotably mounted on the first plate. Dual tracks of ball bearings 16 are interposed between the first turntable 15 and the first plate 14 to reduce friction. A shaft 17 is connected to the center of the first turntable 15 and extends through an opening in the first plate where it is coupled to a motor 18. Motor 18, when energized, rotates turntable 15 about its axis, which is coincident with shaft 17. Preferably, motor 18 is of the variable speed type, so that a control 19 can adjust the rotational speed of turntable 15.

A second plate 20 is mounted between posts 11, 12. Preferably, second plate 20 is bolted to the posts, which have a series of holes arranged so that the distance between first plate 14 and second plate 20 can be adjusted to accommodate different size workpieces. During operation of the apparatus, however, the positions of first plate 14 and second plate 20 are fixed.

Second plate 20 supports a hydraulic plunger 21. A plunger of 10 ton capacity is preferred. Plunger 21 includes a ram 22 which extends through an opening in second plate 20. A hydraulic pump 23 is mounted on post 12 for convenient access to pump handle 24 and is hydraulic coupled to the plunger 21 through hydraulic hose 25. A pressure gauge 26 is coupled to hose 25 for indicating hydraulic pressure between pump 23 and plunger 21. Gauge 26 should indicate pressure up to 10000 psi. Components 21 through 26 function as a hydraulic press.

A third plate 27 is arranged to move between first plate 14 and second plate 20. Guide rails 28, 29 keep third plate 27 in alignment. Third plate 27 is forced by ram 22 toward first plate 20 when pump 23 is actuated. Coil springs 30, 31 urge third plate 27 back toward second plate 10 when hydraulic pressure is relieved.

Third plate 27 carries a second turntable 32, which preferably has dual tracks of ball bearings 33. Turntable 32 can rotate about its axis with runs through its center. The axis of the first turntable 15 is aligned with the axis of second turntable 32. The two turntables 15, 32 face each other and are parallel so that a workpiece WP may be placed between them.

Workpiece WP includes generally ring-shaped segments, made of fusible material, which are to be sealed together. The apparatus 10 may include a sealing member 34 which includes an arm pivotly mounted on a post and spring biased toward a seam of the workpiece WP. If the workpiece WP has heat fusible segments, the arm may support resistivity heated elements mounted in an aluminum block curved to fit against the workpiece.

To operate the apparatus, a workpiece WP is placed between the two turntables 15 and 32. Pumping handle 24 causes ram 22 to extend from plunger 21 to push plate 27 and turntable 32 along its axis towards turntable 15, compressing workpiece WP. Gauge 26 indicates the amount of hydraulic pressure which relates to compression force exerted on the workpiece.

Control 19 is used to set the speed of motor 18 which rotates turntable 15. The motion of turntable 15 is imparted to workpiece WP and thence to turntable 32. The heating sealing member 34 urges against seam of rotating workpiece WP and seals it. The sealing member may be applied to one seam at a time. The sealing member is moved after each seam is sealed. After all segments of workpiece WP are joined, the hydraulic pressure to slave cylinder 21 is relieved and springs 30, 31 urge turntable 32 away from the workpiece WP allowing its removal.

Commercially available components may be used to construct the apparatus. The ball bearing 16, 33 are available as interlocked lazy-susan units, preferably with a load capacity of 1000 pounds. The hydraulic components hydraulic plunger 21 and pump 23 may be Models #RC-106 and P-14 respectively, available from Enerpac division of Applied Power Inc., Butler, Wisconsin, or their equivalents.

The apparatus accepts workpieces having various numbers of segments. It provides the required compression on a stack of segments and is motorized so that the stack assembly be rotated at a desired speed during sealing by the mounted sealing member. The apparatus provides an easily accessible stack compression mechanism and the spring biased sealing member eliminates the guess work of pressure requirements when applying the sealer member to the workpiece WP seams. The motorized rotation of the stack eliminates the possibility of the sealing member remaining at any one point for a prolonged period of time which could cause permanent damage to stack components.

The best mode of the invention has been described. It will be apparent to those skilled in the art that other embodiments of the invention can be made by following the teaching of this description. Therefore, the scope of the invention is to be determined by the following claims

We claim:

1. Apparatus for fabricating a workpiece having a plurality of generally ring-shaped segments made of heat fusible material, said apparatus comprised of:
   a first turntable arranged to rotate on a first axis;
   a second turntable arranged to rotate on a second axis;
   means for holding said first axis in alignment with said second axis and for adapting said second turntable to move along said second axis to change the distance between said first and second turntables;
   pressing means for pushing said second turntable along said second axis for compressing a workpiece between said turntables;
   means for rotating one of said turntables about its axis, the rotation thereof coupled through said workpiece to the other turntable; and
   a heated sealing member spring biased to a seam of said workpiece and adapted to be moved to another seam after said seam is sealed.

* * * * *